(12) United States Patent
Stephens et al.

(10) Patent No.: US 9,969,389 B2
(45) Date of Patent: May 15, 2018

(54) ENHANCED VEHICLE OPERATION

(71) Applicant: Ford Global Technologies, LLC, Dearborn, MI (US)

(72) Inventors: Brett Stephens, Detroit, MI (US); Shane Elwart, Ypsilanti, MI (US); Joseph Walter Neal, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/145,103

(22) Filed: May 3, 2016

(65) Prior Publication Data

US 2017/0320493 A1 Nov. 9, 2017

(51) Int. Cl.
| | |
|---|---|
| *B60W 30/12* | (2006.01) |
| *B62D 15/02* | (2006.01) |
| *B60R 11/04* | (2006.01) |
| *G01C 21/28* | (2006.01) |
| *G01C 21/36* | (2006.01) |
| *G06F 19/00* | (2018.01) |
| *G01C 21/30* | (2006.01) |
| *G06F 17/40* | (2006.01) |

(Continued)

(52) U.S. Cl.
CPC .......... *B60W 30/12* (2013.01); *B62D 15/025* (2013.01); *B60R 11/04* (2013.01); *G01C 21/28* (2013.01); *G01C 21/30* (2013.01); *G01C 21/36* (2013.01); *G01C 21/3691* (2013.01); *G06F 17/40* (2013.01); *G06F 19/00* (2013.01); *G06K 9/00* (2013.01); *G06K 9/00671* (2013.01); *G08G 1/0104* (2013.01)

(58) Field of Classification Search
CPC ..... B60W 30/12; B62D 15/025; G01C 21/36; G01C 21/30; G01C 21/28; G01C 21/3691; B60R 11/04; G06F 17/40; G06F 19/00; G06K 9/00; G06K 9/00671; H04N 7/18; G08G 1/0104; G08G 1/00; G08G 1/0112; G08G 1/0116; G08G 1/012; G08G 1/0129; G08G 1/0133; G08G 1/0141

See application file for complete search history.

(56) References Cited

U.S. PATENT DOCUMENTS

| | | |
|---|---|---|
| 4,792,907 A | 12/1988 | Ikeda et al. |
| 6,826,478 B2 | 11/2004 | Riewe et al. |

(Continued)

FOREIGN PATENT DOCUMENTS

JP 2010151691 A 7/2010

*Primary Examiner* — Behrang Badii
(74) *Attorney, Agent, or Firm* — Frank A. MacKenzie; Bejin Bieneman PLC

(57) ABSTRACT

A confidence value is determined for data collected for a lane assist subsystem in a vehicle. A section curvature is identified for a section of a roadway when the confidence value is below a confidence value, threshold. The section curvature includes at least one section start point and at least one section end point. The section curvature is based at least in part on a heading angle, the heading angle defining an angle between a projected line of travel of the vehicle and a line segment from a vehicle position to the section end point. A distance to a lane boundary is predicted based at least in part on the identified section curvature. One or more vehicle subsystems is actuated based at least in part on the predicted distance to the lane boundary.

20 Claims, 7 Drawing Sheets

(51) Int. Cl.
 *G06K 9/00* (2006.01)
 *G08G 1/01* (2006.01)

(56) References Cited

U.S. PATENT DOCUMENTS

| | | | | |
|---|---|---|---|---|
| 7,151,996 | B2 * | 12/2006 | Stein | G05D 1/0246 |
| | | | | 382/181 |
| 7,522,091 | B2 | 4/2009 | Cong et al. | |
| 2008/0071465 | A1 * | 3/2008 | Chapman | G01C 21/3691 |
| | | | | 701/117 |
| 2010/0104199 | A1 * | 4/2010 | Zhang | G06K 9/00798 |
| | | | | 382/199 |
| 2012/0245817 | A1 | 9/2012 | Cooprider et al. | |
| 2013/0041545 | A1 * | 2/2013 | Bar | B60G 17/0162 |
| | | | | 701/23 |
| 2013/0079990 | A1 * | 3/2013 | Fritsch | B62D 6/007 |
| | | | | 701/41 |
| 2013/0187772 | A1 * | 7/2013 | Akiyama | B60W 30/18145 |
| | | | | 340/436 |
| 2013/0190982 | A1 * | 7/2013 | Nakano | B62D 6/00 |
| | | | | 701/41 |
| 2014/0379164 | A1 * | 12/2014 | Joh | G01C 21/30 |
| | | | | 701/1 |
| 2016/0107644 | A1 * | 4/2016 | Eigel | B60W 50/14 |
| | | | | 701/70 |
| 2017/0016740 | A1 * | 1/2017 | Cui | G01C 21/30 |
| 2017/0025017 | A1 * | 1/2017 | Thomas | G06K 9/00798 |
| 2017/0193384 | A1 * | 7/2017 | Mudalige | G06N 7/005 |
| 2017/0316684 | A1 * | 11/2017 | Jammoussi | G06T 11/60 |

\* cited by examiner

ENHANCED VEHICLE OPERATION

BACKGROUND

A vehicle lane assist subsystem can provide assistance to a vehicle operator, e.g., via a steering subsystem can implement lateral and/or longitudinal control to maintain a vehicle in a road lane. However, such control depends on having sufficient confidence in data provided by vehicle sensors, and in resultant estimations of curvatures of a roadway, and a lane thereof, on which a vehicle is travelling. Assisted lane-keeping cannot be provided with sensors typically found on a vehicle in sub-optimal sensing conditions.

DETAILED DESCRIPTION

A lane assist subsystem of a vehicle can estimate a roadway curvature in poor-sensing conditions to operate the vehicle where location data is incomplete and/or unreliable. The curvature is determined based at least in part on a section start point, a vehicle heading angle, and a section end point. The curvature defines a distance to a lane boundary indicating the distance that the vehicle travels before exiting a current road lane. The lane assist subsystem actuates vehicle subsystems to move the vehicle according to the curvature. If the vehicle is still on a part of the roadway with poor-sensing conditions, the lane assist subsystem prompts the operator to assume full control of the vehicle. Otherwise, the lane assist subsystem continues to operate the vehicle, actuating one or more vehicle subsystems, until the poor-sensing conditions return.

Figure 1:
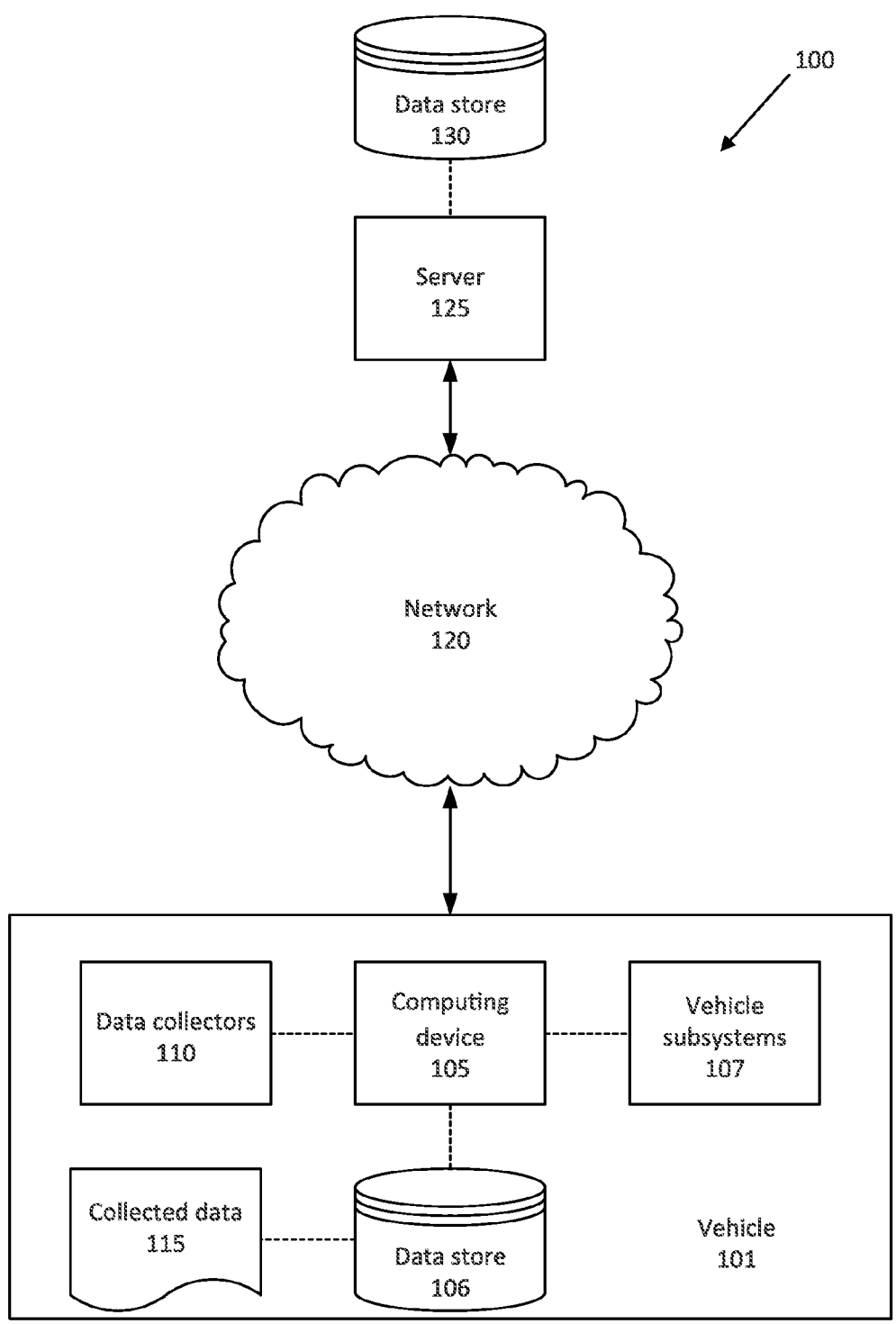
FIG. 1 is a block diagram for an example system for operating a vehicle.

FIG. 1 illustrates a system 100 for operating a vehicle 101. A computing device 105 in the vehicle 101 is programmed to receive collected data 115 from one or more data collectors 110, e.g., vehicle 101 sensors, concerning various data 115 related to the vehicle 101. For example, vehicle 101 data may include a location of the vehicle 101, vehicle 101 speed, heading, etc. Location data may be in a known form, e.g., go-coordinates (latitude and longitude coordinates) obtained via a navigation system, as is known, that uses the Global Positioning System (GAPS). Further examples of data 115 can include measurements of vehicle 101 systems and components, e.g., locations of vehicle 101 wheels relative to a road lane marker, heading of the vehicle 101 relative to the roadway curvature, etc.

The computing device 105 is generally programmed for communications on a vehicle network or communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including data collectors 110. Alternatively or additionally, in cases where the computing device 105 actually comprises multiple devices, the vehicle network or bus may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

The vehicle 101 includes a plurality of subsystems 107. The subsystems 107 control vehicle 101 components, e.g., a vehicle seat, mirror, tiltable and/or telescoping steering wheel, etc. The subsystems 107 include, e.g., a lane assist subsystem, a steering subsystem, a propulsion subsystem, etc. The computing device 105 may actuate the subsystems 107 to control the vehicle 101 components, e.g., to move the vehicle 101 to along a predetermined path.

The vehicle 101 can include a lane assist subsystem 107. The lane assist subsystem 107 provides lateral and longitudinal control of the vehicle 101 to keep the vehicle 101 in a roadway lane. The computing device 105 uses data 115 from data collectors 110 to determine whether the vehicle 101 is about to leave the lane, and actuates the lane assist subsystem 107 based on the data 115. For example, the computing device 105 can instruct the lane assist subsystem 107 to actuate a steering subsystem 107 and/or a propulsion subsystem 107 to move the vehicle 101 away from a lane boundary and into the lane. The computing device 105 can also instruct the lane assist subsystem 107 to prompt the human operator when the data 115 indicate that the vehicle 101 is about to leave the lane.

Data collectors 110 may include a variety of devices. For example, various controllers in a vehicle may operate as data collectors 110 to provide data 115 via the vehicle 101 network or bus, e.g., data 115 relating to vehicle speed, acceleration, position, system and/or component functionality, etc. Further, other data collectors 110 could include cameras, motion detectors, etc., i.e., data collectors 110 to provide data 115 for evaluating location of a vehicle 101 in a road lane.

Collected data 115 may include a variety of data collected in a vehicle 101. Examples of collected data 115 are provided above, and moreover, data 115 are generally collected using one or more data collectors 110, and may additionally include data calculated therefrom in the computing device 105, and/or at the server 125. In general, collected data 115 may include any data that may be gathered by the data collectors 110 and/or computed from such data. For example, the computing device 105 may collect data 115 on a road traveled by the vehicle 101, and determine a section 140 of a roadway based on the data 115. The data 115 can comprise an electronic horizon that can be used with one or more vehicle subsystems 107. The electronic horizon is a collection of data 115 such as is known obtained from vehicle 101 surroundings indicating a current position of the vehicle 101 and predicting a future trajectory of the vehicle 101.

The computing device 105 reviews the data 115 collected by the data collectors 110 determines a confidence value for the data 115, e.g., using known methods. For example, the computer 105 may receive data 115 that includes images, radar, liar, vehicle-to-vehicle communications, GAPS location information, etc. Indicating features of a roadway on which the vehicle 101 is traveling, condition of the roadway, etc. The computer 105 may evaluate the quality of the data, e.g., image quality, clarity of objects detected, precision of the data, accuracy of the data, completeness of the data, etc., as is known, to determine the confidence value for the data 115. The confidence value is thus a measure of the confidence that the vehicle subsystems 107 are operational and providing sufficient data to the computer 105. The computing device can determine confidence values for specific data 115 collected from, e.g., a right lane, a left lane, and a presence of another vehicle 101 in front of the vehicle 101. The confidence values for the specific data 115 can be combined using known methods to determine a global confidence value for all of the data 115. The confidence values are dependent on data collector 110 resolution, and the data collectors 110 can be calibrated to reflect their ability to reliably derive the global confidence value. The confidence value can also be determined from previously acquired data 15, e.g., drive history data 115.

If the confidence value the data 115 is below a predetermined confidence value threshold, the computing device 105 determines that the vehicle 101 is in a low-confidence portion of the roadway, i.e., a part of the roadway with poor-sensing conditions. The confidence value threshold may be determined using known methods based on the confidence values for the vehicle subsystems 107 that the computing device 105 determines to operate with the lane assist subsystem 107 and may be the lowest confidence value for the computing device 105 to terminate control of at least one of the subsystems 107 by the lane assist subsystem 107. If the confidence value for the data 115 is above the confidence value threshold, the computing device 105 uses the data 115 from the electronic horizon to actuate the vehicle subsystems 107. If the confidence value for the data. 115 is below the confidence value threshold, the computing device 105 determines a curvature 160, as described below, for the low-confidence portion and actuates the lane assist subsystem 107 based at least in part on the curvature 160.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologists when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be programmed to determine an appropriate action for one or more vehicles 101, and to provide direction to the computing device 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115.

Figure 2:
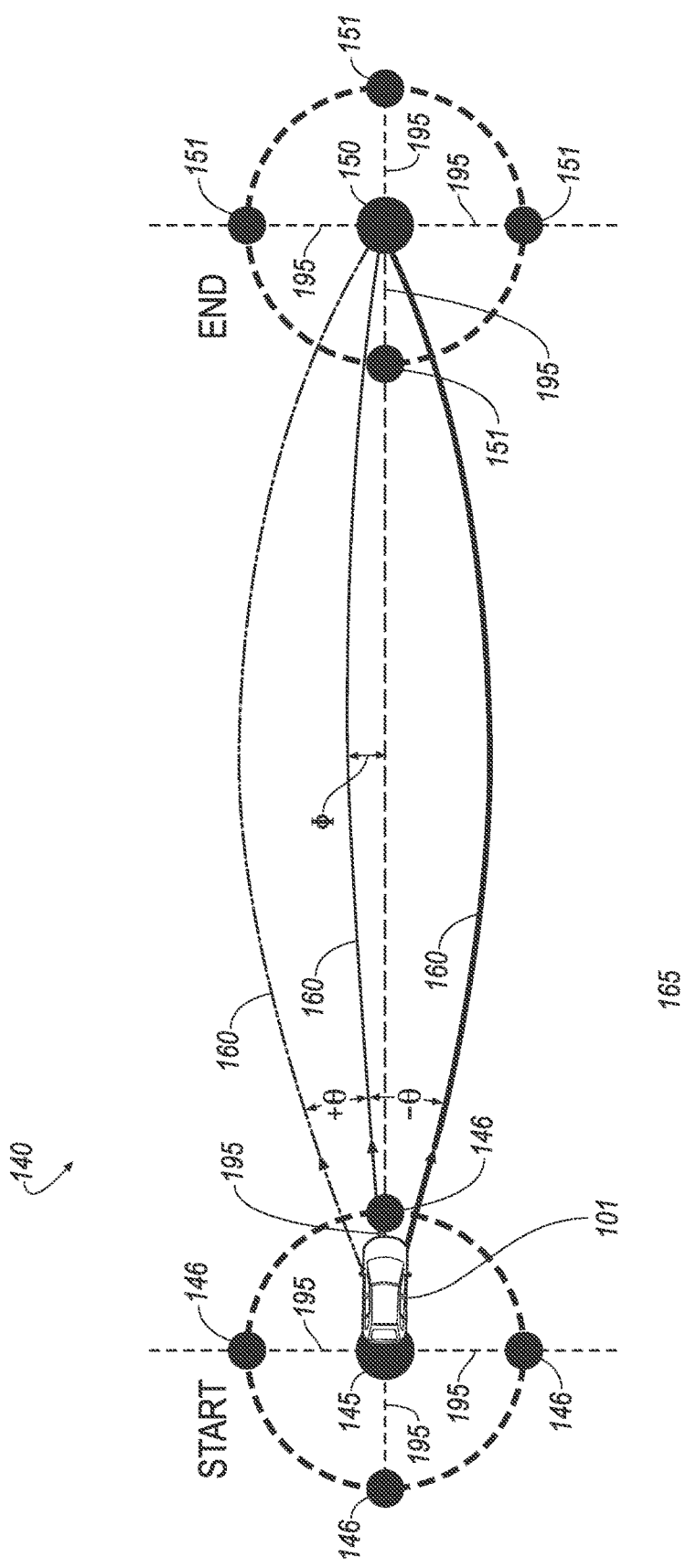
FIG. 2 illustrates example section curvatures for a section of a roadway.

FIG. 2 illustrates example curvatures 160 determined for a vehicle 101. The computing device 105 can determine curvatures 160 for a section 140 of a roadway. The section 140 is a portion of the roadway that the vehicle 101 traverses. The section 140 includes a acquired section start point 145 and a acquired section end point 150. The section start point 145 is typically a current vehicle 101 position on the roadway determined with data 115 acquired from data collectors 110, e.g., location data 115. The section end point 150 is typically a point on the roadway that is a predetermined distance, e.g., 2 kilometers, away from the current vehicle 101 position. As used herein, the term "curvature" is defined as an arc starting at the section start point 145 and ending at the section end point 150 along which the vehicle 101 is predicted to traverse.

The curvatures 160 are based on the acquired section start point 145, the acquired section end point 150, and a vehicle 101 heading angle $\Phi$. The computing device 105 may also determine curvatures 160 for the acquired section start point 145 and one or more offset start points 146, each offset start point 146 being a position of the vehicle 101 (i.e., represented by the acquired start point 145) offset by an offset distance 195. The offset start points 146 that are offset from the acquired start point 145 by the offset distance 195. The offset distance 195 represents uncertainty in the determination of the acquired start point 145 from the location data 115. The start point 145 and the offset start points 146 are collectively referred to as "start points" 145, 146.

The computing device 105 may further determine curvatures 160 for each of a plurality of section end points 150, 151, the offset end points 151 being offset form the acquired end point 150 by an offset distance 195. As described above, the offset distance 195 represents uncertainty in the location data 115 used to determine the acquired end point 150.

Further still, the computing device 105 may determine curvatures 160 based on a plurality of vehicle 101 heading angles, the heading angles including the vehicle heading angle $\Phi$ and a sum of the vehicle 101 heading and a predetermined offset angle $\theta$. The heading angle $\Phi$ is the angle between the projected line of travel of the vehicle 101 and a line segment connecting the start point 145 to the end point 150.

Figure 3:
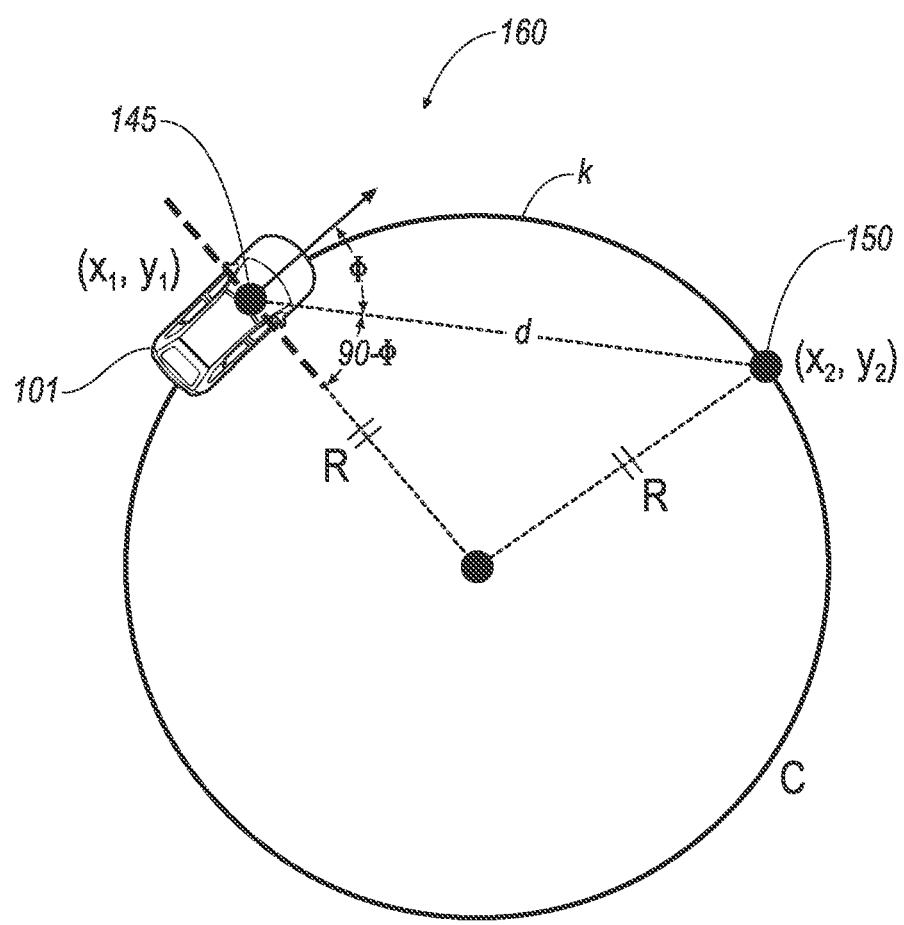
FIG. 3 is a diagram of an example determination of the section curvature.

With the offset start points 146, the offset end points 151, and the heading angles, the computing device 105 can determine a plurality of curvatures 160. The example of FIG. 2, shows five start points 145, 146, five end points 150, 151 and three heading angles ($\Phi$, $\Phi+\theta$, $\Phi-\theta$), resulting in 75 possible curvatures 160 that the computing device 105 can determine, of which 3 are shown in FIG. 3. That is, any one of the section start points 145, 146 and any one of the section end points 150, 151 can define a curvature 160 with any one of the vehicle 101 heading angles.

FIG. 3 illustrates an example calculation of the curvature 160 for the section 140. In FIG. 3, the section start point, which is one of the section start point 145 and one of the offset start points 146, has coordinates $x_1$, $y_1$, indicating a position of the section start point 145, 146, e.g., a latitude and a longitude, respectively. The section end point, which is one of the section end point 150 and one of the offset endpoints 151, has coordinates $x_2$, $y_2$, indicating a position of the section end point 150, 151, e.g., a latitude and a longitude, respectively. The distance d between the section start point 145 and the section end point 150 is determined using location data 115, e.g., from a GAPS, as is known, and is defined as the straight line distance between the section start point 145, 146 and the section end point 150, 151, i.e., $$d = \sqrt{(x_2-x_1)^2+(y_2-y_1)^2}$$

The vehicle 101 has a trajectory that includes the heading angle Φ, which is the angle between a projected line of travel of the vehicle 101 and a line segment connecting the section start point 145, 146 and the section end point 150, 151, i.e., the line segment defining the distance d. The projected line of travel of the vehicle 101 can be determined from the trajectory of the vehicle 101, i.e., determined from data 115 collected from the vehicle 101, e.g., vehicle speed, vehicle position, vehicle heading, etc. The angle Φ, the section start point 145, 146, the section end point 150, 151, and the distance d define a circle C with radius R and an isosceles triangle with two sides having a length R. Thus, the arc k of the circle C that connects the section start point 145, 146 and the section end point 150, 151 can be determined as:

$$k = \frac{d}{2\cos(90-\Phi)}$$

where Φ is measured in degrees and cos( ) is the cosine function, as is known. The value for the arc k is stored in the computing device 105 as the curvature 160. Thus, the computing device 105 determines the curvature 160 based on the section start point 145, 146, the section end point 150, 151, and the angle Φ between the vehicle 101 heading and the line segment connecting the section start point 145, 146 and the section end point 150, 151.

The section 140 may include a plurality of section start points 145, 146 and a plurality of section end points 150, 151, as described above in FIG. 2. Each section start point 145 defines a distance d with each section end point 150. In the example of FIG. 2, which has 1 section start point 145, four offset section start points 146, one section end point 150, and four offset section end points 151, this results in 25 distances d, and thus 25 curvatures 160. Furthermore, each distance d includes a heading angle Φ between the vehicle 101 predicted motion of travel and the line segment defining d.

As described above, the angle Φ an be offset by an offset angle θ, which results in 3 angles: Φ, Φ+θ, Φ−θ. The angles Φ+θ, being offset by the offset angle θ from the heading angle Φ, are defined as "offset heading angles." Thus, a curvature 160 determined based on one of the offset heading angles is defined as an "offset heading section curvature" 160. Because each of the 25 curvatures 160 can be offset by the offset angle θ, the total number of curvatures 160 that can be determined for the 5 start points 145, 146, the 5 end points 150, 151, and the 3 angles Φ, Φ+θ, is 5×5×3=75 curvatures 160. The computing device 105 can use a different number of start points 145, 146, a different number of end points 150, 151, and a different number of heading angles Φ to determine a different number of curvatures 160.

The computing device 105 can be programmed to determine a plurality of offset heading section curvatures 160. Each offset heading section curvature 160 is the section curvature 160 for a respective one of a plurality of predetermined offset angles. The section curvature 160 and the plurality of offset heading section curvatures 160 define a plurality of curvatures 160.

The computing device 105 can determine a curvature 160 based on one of the offset section start points 146, as described above, defining an "offset start section curvature" 160. The computing device 105 identifies the offset start section curvature 160 based on an offset start angle. The offset start angle is defined as an angle between the projected line of travel of the vehicle 101 and a line segment connecting the section end point 150 and one of the offset section start points 146.

The computing device 105 can determine a curvature 160 based on one of the offset section end points 151, as described above, defining an "offset end section curvature" 160. The computing device identifies the offset end section curvature 160 based on an offset end angle. The offset end angle is defined as an angle between the projected line of travel of the vehicle 101 and a line segment connecting the vehicle 101 position and one of the offset section end points 151.

Figure 4:
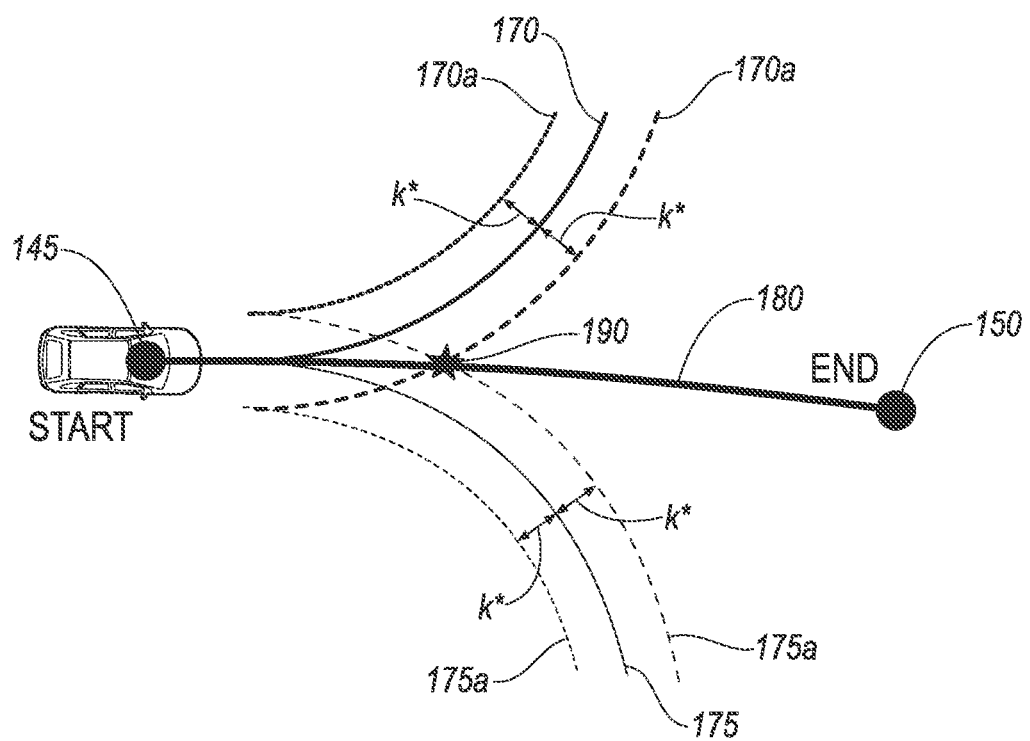
FIG. 4 illustrates a lane boundary exit point and a selected curvature for the section of a roadway.

FIG. 4 illustrates an example lane boundary exit point 190. Based on the plurality of curvatures 160, the computing device 105 determines a maximum curvature 170 and a minimum curvature 175. For the plurality of curvatures 160 described above, the computing device 105 can determine a magnitude for each of the plurality of curvatures 160, defining a plurality of magnitudes. The computing device 105 identifies a largest magnitude of the plurality of magnitudes, defining the maximum curvature 170 as the curvature 160 associated with the largest magnitude, and a smallest magnitude of the plurality of magnitudes, defining a minimum curvature 175 as the curvature 160 associated with the smallest magnitude.

The computing device 105 then determines maximum boundary curvatures 170a and minimum boundary curvatures 175a, the maximum boundary curvatures 170a being the maximum curvature 170 offset by a predetermined boundary threshold k*, and the minimum boundary curvatures 175a being the minimum curvature 175 offset by the predetermined boundary threshold k*. The boundary threshold k* is predetermined and based at least in part on a width of a road lane, e.g., the boundary threshold k* may be 1.65 meters. That is, the curvature 160 may represent a center of the road lane, and the boundary threshold k* thus represents the boundaries of the lane, i.e., the lane markers. Thus, when the vehicle 101 exceeds the boundary curvatures 170a, 175a, the vehicle 101 exits the road lane and/or begins to cross a lane boundary.

The computing device 105 defines the lane boundary exit point 190 as the point of the closest intersection of the maximum boundary curvatures 170a and the minimum boundary curvatures 175a. That is, the curvatures 160, which, as described above, represent movement of the vehicle 101 within the road lane, are bounded by the boundary curvatures 170a, 175a. Thus, the point where the boundary curvatures 170a, 175a meet and diverge indicates the first point at which the vehicle 101 may exit the lane. The computing device 105 defines this point as the lane boundary exit point 190, and may be programmed to terminate virtual operation of one or more vehicle subsystems 107 when the vehicle 101 travels beyond the lane boundary exit point 190. That is, the computing device 105 determines an intersection point of the maximum curvature 170 and the minimum curvature 175. For example, if the confidence value for the data 115 collected on the road beyond the lane boundary exit point 190 is still below the confidence threshold, the vehicle 101 may move out of the current lane. To prevent the vehicle 101 from moving out of the current lane, the computing device 105 may be programmed to terminate control from the lane assist subsystem 107, and to prompt the human operator to assume full control of one or more vehicle subsystems 107, e.g., steering.

The computing device 105 determines a selected curvature 180 based on the lane boundary exit point 190. The selected curvature 180 represents the curvature 160 that the vehicle 101 follows to remain in the lane in the section 140 to the lane boundary exit point 190. The computing device 105 can determine the selected curvature 180 as the arc defined by the vehicle 101 position, the lane boundary exit point 190, and the heading angle Φ, as described above. That is, rather than the end point 150, 151, the computing device 105 uses the lane boundary exit point 190 to determine the selected curvature 180. The computing device 105 can actuate vehicle subsystems 107 to move the vehicle 101 along the selected curvature 180. The arc length of the selected curvature 180 from the section start point 145 to the lane boundary exit point 190 indicates a distance that the vehicle 101 moves before beginning to cross a lane boundary, i.e., a distance to the lane boundary.

Figure 5:
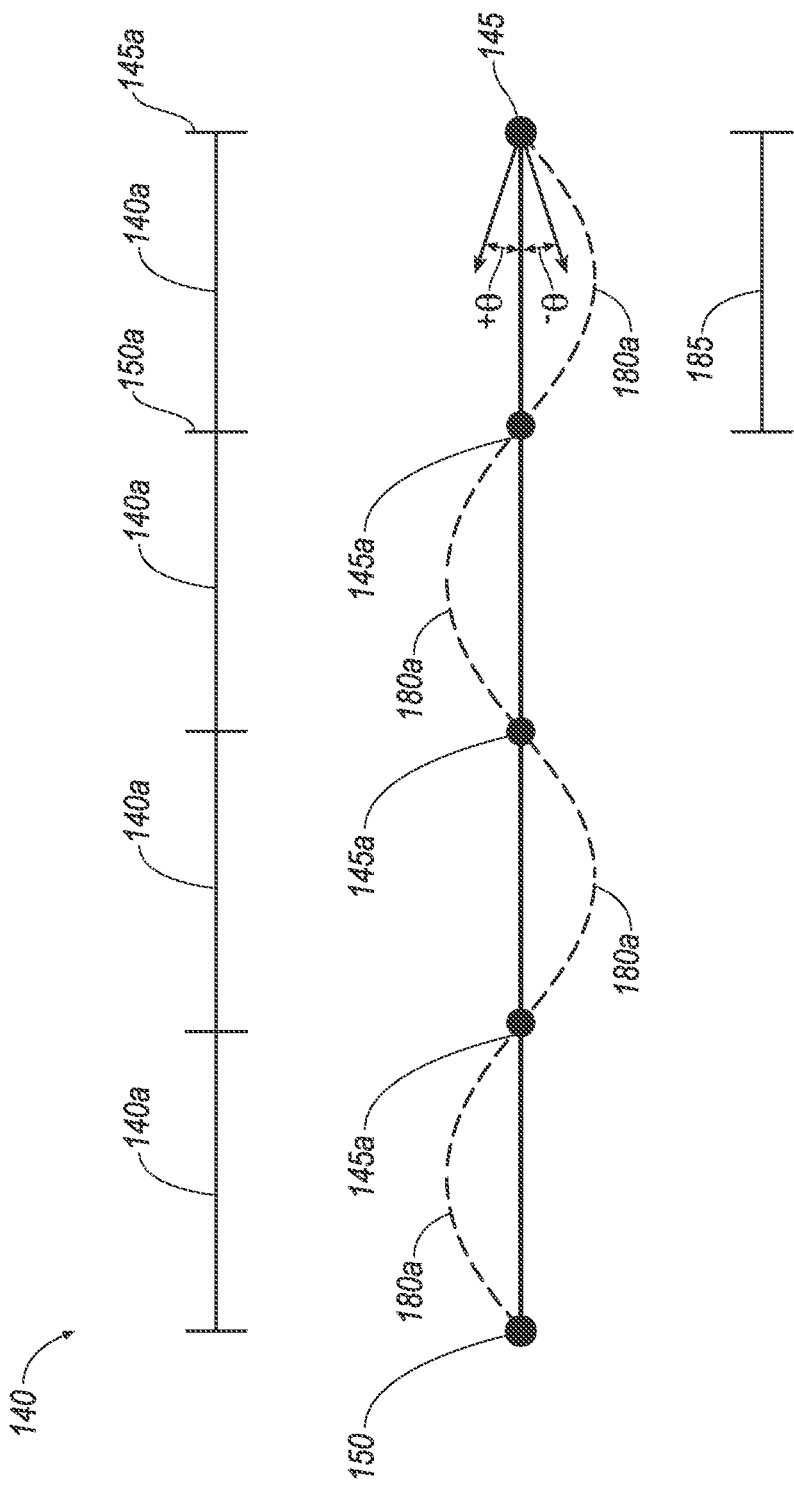
FIG. 5 illustrates a plurality of example subsections and subsection curvatures for a section of a roadway.

FIG. 5 illustrates another section 140 including a plurality of subsections 140a. Based on variation in the roadway in the section 140, the computing device 105 can determine that the vehicle 101 will begin to cross the lane boundary before reaching the exit point 150, 151. That is, the lane boundary exit point 190 may be closer to the vehicle 101 than the exit point 150, 151. To keep the vehicle 101 in the roadway lane, the computing device 105 can divide the section 140 into subsections 140a, each subsection 140a having a spacing 185 that is less than the distance to the lane boundary. The subsections 140a, are divisions of the section 140, i.e., the sum of the subsections 140a is the section 140. Each subsection 140a starts at a subsection start point 145a and ends at a subsection end point 150a. For example, if the distance to the lane boundary is 700 meters, each subsection 140a may be, e.g., 500 meters long, i.e., each subsection start point 145a is spaced by 500 meters. Alternatively, computing device 105 can determine a subsection 140a with a subsection end point 150a that is substantially the lane boundary exit point 190, and determine curvatures 160 based on this single subsection 140a.

Each subsection 140a includes a selected subsection curvature 180a. That is, the computing device 105 determines a plurality of curvatures 160 for the subsection 140a, e.g., the 75 curvatures 160 described above, including a selected subsection curvature 180a. The computing device 105 can determine a lane boundary exit point 190 for each subsection 140a to determine each selected subsection curvature 180a. For each selected subsection curvature 180a, the computing device 105 actuates the subsystems 107 to follow the subsection curvature 180a in the section 140a. The computing device 105 can sum the selected subsection curvatures 180a to determine a selected curvature 180 for the entire section 140. That is, while the curvature 180 for the section 140 as determined without the subsections 140a can result in the vehicle 101 beginning to cross a lane boundary prior to reaching the exit point 150, 151, the plurality of subsection curvatures 180a can be used by the computing device 105 to keep the vehicle 101 within the lane boundary throughout the section 140.

Figure 6:
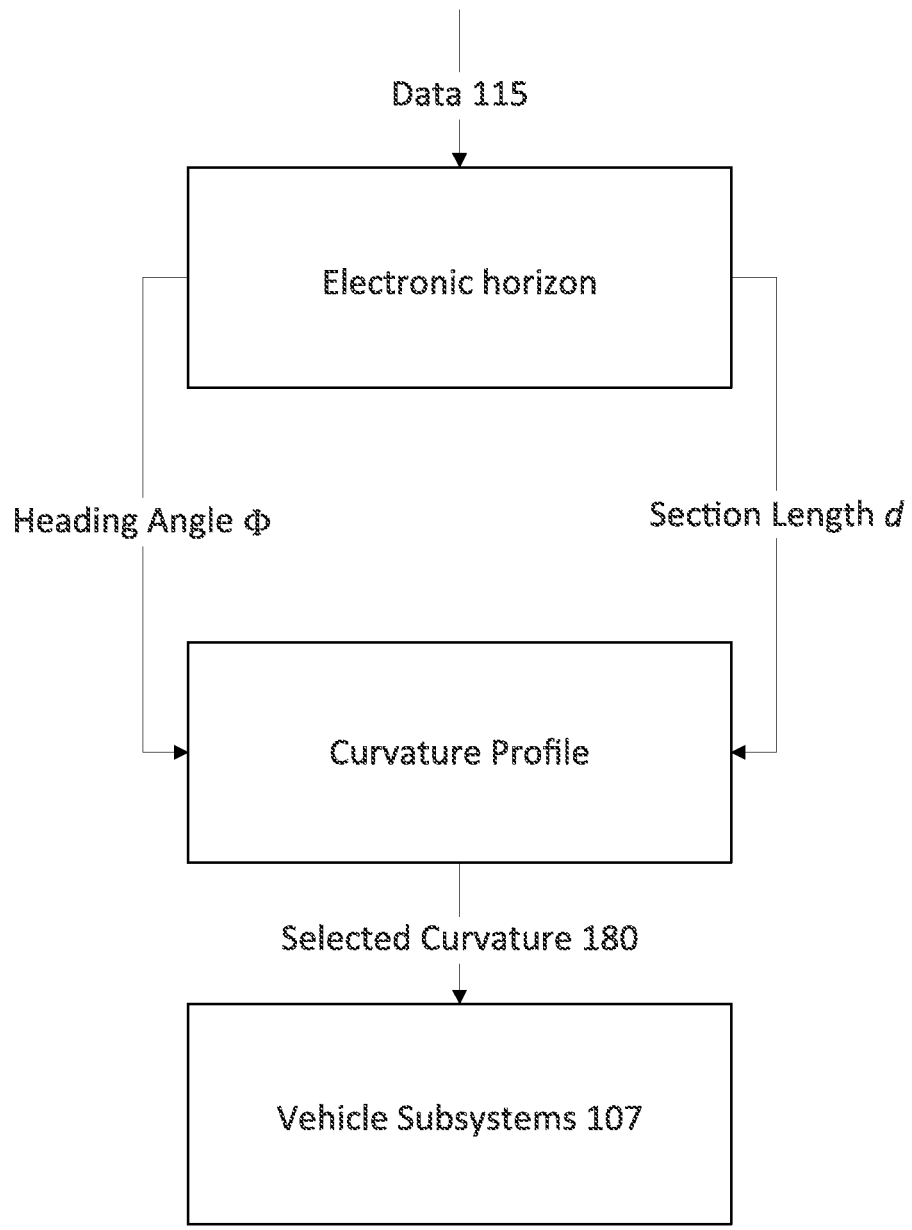
FIG. 6 is a block diagram of an example curvature profile for determining the section curvature and operating the vehicle.

FIG. 6 illustrates an example curvature profile that the computing device 105 can use to adjust the vehicle subsystems 107 to keep the vehicle 101 in the roadway lane. The computing device 105 collects data 115 that are collected into an electronic horizon. The electronic horizon is a collection of data 115 such as is known obtained from vehicle 101 surroundings indicating a current position of the vehicle 101 and predicting a future trajectory of the vehicle 101. The computing device 105 uses the data. 115 in the electronic horizon when the confidence value for the data 115 is above the confidence value threshold. For example, the computing device 105 can use the data 115 in the electronic horizon to actuate vehicle subsystems 107, e.g., a lane assist subsystem 107. The computing device 105 can also use a heading angle Φ from the electronic horizon and a predetermined section length d to determine a plurality of curvatures 160, as described above. With the curvatures 160, the computing device 105 can develop a curvature profile that is a collection of selected curvatures 180 for a plurality of section lengths d, e.g., a look-up table.

If the confidence value of the data 115 drops below the confidence value threshold, the computing device 105 stops using data 115 from the electronic horizon. The computing device 105 then selects one of the selected curvatures 180 from the curvature profile and actuate the vehicle subsystems 107 to move the vehicle 101 according to the selected curvature 180. For example, the computing device 105 can determine a distance to a lane boundary and select a curvature 160 from the curvature profile to move the vehicle 101 to the lane boundary exit point 190. The curvature profile can be predetermined and stored in the server 125 and/or the data store 106. If the confidence value for the data 115 rises above the confidence value threshold, the computing device 105 then returns to using the data 115 from the electronic horizon.

Figure 7:
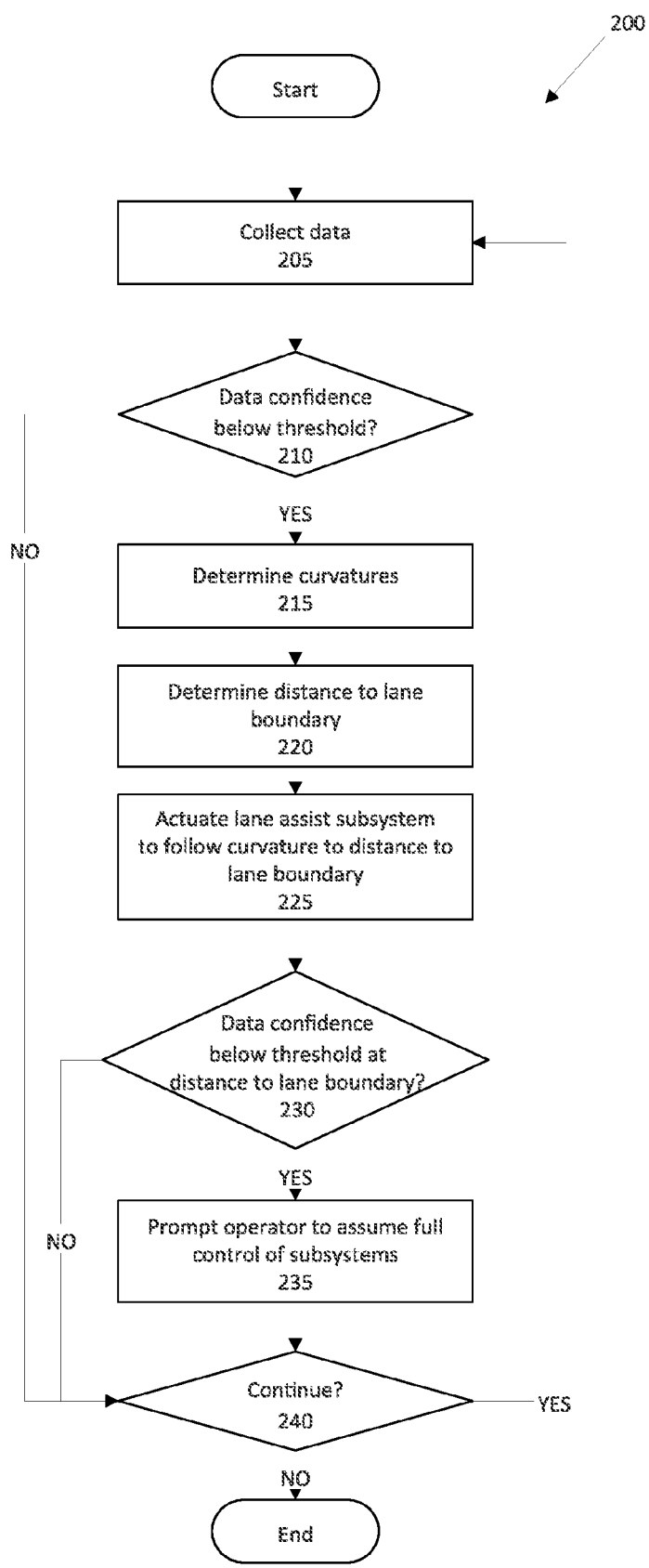
FIG. 7 illustrates a process for operating a vehicle in a section of a roadway.

FIG. 7 illustrates an example process 200 for operating a vehicle 101 in poor-sensing conditions. The process 200 starts in a block 205, where the computing device 105 collects data 115 about the roadway from the data collectors 110. The data 115 can be used for the lane assist subsystem 107 to keep the vehicle 101 in the road lane.

Next, in a block 210, the computing device 105 determines a confidence value for the data 115. As described above, the computing device 105 evaluates the quality of the data 115 using known methods and assigns the confidence value to the data 115. When the confidence value is below a confidence threshold, the computing device 105 can determine to terminate control from the lane assist subsystem 107 and return control to the operator. If the computing device 105 determines that the confidence value for the data 115 is below the confidence threshold, the process 200 continues in a block 215. Otherwise, the process 200 continues in a block 240.

In the block 215, the computing device 105 determines the curvature 160. As described above, the computing device 105 determines at least one section start point 145, 146, at least one section end point 150, 151, and then determines the curvature 160 for the section 140. The computing device 105 may determine the curvature 160 for an offset angle θ, as described above. The computing device 105 determines the current heading angle Φ of the vehicle 101 based on the vehicle 101 trajectory. The computing device 105 can determine a plurality of curvatures 160 based on more than one section start point 145 and/or more than one section end point 150 and/or more than one heading angle Φ.

Next, in a block 220, the computing device 105 determines the distance to the lane boundary. As described above, the computing device 105 determines a maximum curvature 170 and a minimum curvature 175. Based on the maximum curvature 170 and the minimum curvature 175, the computing device 105 determines the lane boundary exit point 190, as described above, defining the selected curvature 180. The distance to the lane boundary indicates the distance that the vehicle 101 can travel before exiting the current lane, i.e., the arc length of the selected curvature 180 from the start point 145 to the lane boundary exit point 190.

Next, in a block 225, the computing device 105 actuates the lane assist subsystem 107 according to the selected curvature 180. The lane assist subsystem 107, as described above, actuates vehicle subsystems 107, e.g., the steering subsystem 107, the propulsion subsystem 107, etc., to move the vehicle 101 according to the selected curvature 180.

Next, in a block 230 the computing device 105 determines whether the confidence value for the data 115 is below the confidence value threshold at the distance to the lane boundary. While the lane assist subsystem 107 moves the vehicle 101 according to the selected curvature 180, the confidence value of the data 115 can rise above the confidence value threshold. When the confidence value rises above the confidence value threshold, the lane assist subsystem 107 can continue to operate the vehicle 101. However, if the confidence value remains below the confidence value threshold, then the lane assist subsystem 107 may no longer be able to maintain the vehicle 101 in the roadway lane, and the computing device 105 returns full control of the vehicle 101 to the operator. If the confidence value is below the confidence value threshold at the distance to the lane boundary, the process 200 continues in a block 235. Otherwise, the process 200 continues in a block 240.

In the block 235, the computing device 105 prompts the operator and returns full control of the vehicle 101 to the operator. That is, the computing device 105 prompts the human operator to assume manual control of one or more of the vehicle subsystems 107 and terminates control by the lane assist subsystem 107. Because the confidence value of the data 115 remains below the confidence value threshold beyond the distance to the lane boundary, the lane assist subsystem 107 may be unable to keep the vehicle 101 in the roadway lane. Thus, the computing device 105 can return control of the vehicle 101 to the human operator. The computing device 105 may prompt the human operator by, e.g., displaying a message on a vehicle 101 human-machine interface (HMI) indicating that at least one subsystem 107 will revert to manual operation. The computing device 105 may then terminate control by the computing device 105 of one or more vehicle subsystems 107.

In the block 240, the computing device 105 determines whether to continue the process 200. For example, if the vehicle 101 has reached the destination, the computing device 105 can determine not to continue the process 200. If the computing device 105 determines to continue, the process 200 continues in the block 205 to collect more data 115. Otherwise, the process 200 ends.

As used herein, the adverb "substantially" modifying an adjective means that a shape, structure, measurement, value, calculation, etc. May deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Pearl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   determine a sensor confidence value that is a measure of reliability of roadway data collected by a sensor in a lane assist subsystem in a vehicle;
   upon determining that the sensor confidence value is below a confidence value threshold, then determine a section curvature for a section of a roadway, the section curvature including at least one section start point and at least one section end point, wherein the section curvature is determined based at least in part on a heading angle, the heading angle defining an angle between a projected line of travel of the vehicle and a line segment from a vehicle position to the section end point;

replace a lane boundary distance determined by the roadway data collected for the lane assist subsystem for the section of the roadway by predicting a distance to a lane boundary based at least in part on the determined section curvature; and actuate one or more vehicle subsystems to operate in the section of the roadway based at least in part on the predicted distance to the lane boundary in the section of the roadway.

2. The system of claim 1, wherein the instructions further include instructions to terminate control by the computer of one or more vehicle subsystems when the vehicle is at the distance to the lane boundary and the confidence value is below the confidence value threshold.

3. The system of claim 1, wherein the section includes a plurality of subsections, the instructions further including instructions to determine a subsection curvature for each subsection.

4. The system of claim 3, wherein the instructions further include instructions to sum the subsection curvatures to determine the section curvature.

5. The system of claim 1, wherein the instructions further include instructions to determine an offset heading section curvature based at least in part on an offset heading angle, the offset heading angle defined as a sum of the heading angle and a predetermined offset angle.

6. The system of claim 5, wherein the instructions further include instructions to:
determine a plurality of offset heading section curvatures, each offset heading section curvature being the offset heading section curvature for a respective one of a plurality of predetermined offset angles, wherein the section curvature and the plurality of offset heading section curvatures define a plurality of curvatures;
determine a magnitude for each of the plurality of curvatures, defining a plurality of magnitudes;
determine a largest magnitude of the plurality of magnitudes and a smallest magnitude of the plurality of magnitudes;
determine an intersection point of the one of the plurality of curvatures associated with the largest magnitude and the one of the plurality of curvatures associated with the smallest magnitude; and
determine a selected curvature that is an arc defined by the vehicle position, the intersection point, and the heading angle.

7. The system of claim 1, wherein the instructions further include instructions to determine an offset start section curvature based on an offset start angle, the offset start angle defining an angle between the projected line of travel of the vehicle and a line segment connecting the section end point of the section in which the vehicle is operating and an offset start point that is the sum of the vehicle position and a predetermined distance.

8. The system of claim 7, wherein the instructions farther include instructions to:
determine a plurality of offset start section curvatures, each offset start section curvature being the offset start section curvature for one of a plurality of offset start angles, wherein the section curvature and the plurality of offset start section curvatures define a plurality of curvatures;
determine a magnitude for each of the plurality of curvatures, defining a plurality of magnitudes;
determine a largest magnitude of the plurality of magnitudes and a smallest magnitude of the plurality of magnitudes;
determine an intersection point of the one of the plurality of curvatures associated with the largest magnitude and the one of the plurality of curvatures associated with the smallest magnitude; and
determine a selected curvature that is an arc defined by the vehicle position, the intersection point, and the heading angle.

9. The system of claim 1, wherein the instructions further include instructions to determine an offset end section curvature based on an offset end angle, the offset end angle defining an angle between the projected line of travel of the vehicle and a line segment connecting the vehicle position and an offset end point that is the sum of the section end point and a predetermined distance.

10. The system of claim 9, wherein the instructions further include instructions to:
determine a plurality of offset end section curvatures, each offset end section curvature being the offset end section curvature for one of a plurality of offset end angles, wherein the section curvature and the plurality of offset end section curvatures define a plurality of curvatures;
determine a magnitude for each of the plurality of curvatures, defining a plurality of magnitudes;
determine a largest magnitude of the plurality of magnitudes and a smallest magnitude of the plurality of magnitudes;
determine an intersection point of the one of the plurality of curvatures associated with the largest magnitude and the one of the plurality of curvatures associated with the smallest magnitude; and
determine a selected curvature that is an arc defined by the vehicle position, the intersection point, and the heading angle.

11. A method, comprising:
determining a sensor confidence value that is a measure of reliability of roadway data collected by a sensor in a lane assist subsystem in a vehicle;
upon determining that the sensor confidence value is below a confidence value threshold, then determining a section curvature for a section of a roadway, the section curvature including at least one section start point and at least one section end point, wherein the section curvature is based at least in part on a heading angle, the heading angle defining an angle between a projected line of travel of the vehicle and a line segment from a vehicle position to the section end point;
replacing a lane boundary distance determined by the roadway data collected for the lane assist subsystem for the section of the roadway by predicting a distance to a lane boundary based at least in part on the determined section curvature; and
actuating one or more vehicle subsystems based at least in part on the predicted distance to the lane boundary.

12. The method of claim 11, further comprising terminating control by the computer of one or more vehicle subsystems when the vehicle is at the distance to the lane boundary and the confidence value is below the confidence value threshold.

13. The method of claim 11, wherein the section includes a plurality of subsections, the method further comprising determining a subsection curvature for each subsection.

14. The method of claim 13, further comprising summing the curvatures for each subsection to determine the section curvature.

15. The method of claim 11, further comprising determining an offset heading section curvature based at least in part on an offset heading angle, the offset heading angle defined as a sum of the heading angle and a predetermined offset angle.

16. The method of claim 15, further comprising:
determining a plurality of offset heading section curvatures, each offset heading section curvature being the offset heading section curvature for one of a plurality of predetermined offset angles, wherein the section curvature and the plurality of offset heading section curvatures define a plurality of curvatures;
determining a magnitude for each of the plurality of curvatures, defining a plurality of magnitudes;
determining a largest magnitude of the plurality of magnitudes and a smallest magnitude of the plurality of magnitudes;
determining an intersection point of the one of the plurality of curvatures associated with the largest magnitude and the one of the plurality of curvatures associated with the smallest magnitude; and
determining a selected curvature that is an arc defined by the vehicle position, the intersection point, and the heading angle.

17. The method of claim 11, further comprising determining an offset start section curvature based on an offset start angle, the offset start angle defining an angle between the projected line of travel of the vehicle and a line segment connecting the section end point of the section in which the vehicle is operating and an offset start point that is the sum of the vehicle position and a predetermined distance.

18. The method of claim 17, further comprising:
determining a plurality of offset start section curvatures, each offset start section curvature being the offset start section curvature for one of a plurality of offset start angles, wherein the section curvature and the plurality of offset start section curvatures define a plurality of curvatures;
determining a magnitude for each of the plurality of curvatures, defining a plurality of magnitudes;
determining a largest magnitude of the plurality of magnitudes and a smallest magnitude of the plurality of magnitudes;
determining an intersection point of the one of the plurality of curvatures associated with the largest magnitude and the one of the plurality of curvatures associated with the smallest magnitude; and
determining a selected curvature that is an arc defined by the vehicle position, the intersection point, and the heading angle.

19. The method of claim 11, further comprising determining an offset end section curvature based on an offset end angle, the offset end angle defining an angle between the projected line of travel of the vehicle and a line segment connecting the vehicle position and an offset end point that is the sum of the section end point and a predetermined distance.

20. The method of claim 19, further comprising:
determining a plurality of offset end section curvatures, each offset end section curvature being the offset end section curvature for one of a plurality of offset end angles, wherein the section curvature and the plurality of offset end section curvatures define a plurality of curvatures;
determining a magnitude for each of the plurality of curvatures, defining a plurality of magnitudes;
determining a largest magnitude of the plurality of magnitudes and a smallest magnitude of the plurality of magnitudes;
determining an intersection point of the one of the plurality of curvatures associated with the largest magnitude and the one of the plurality of curvatures associated with the smallest magnitude; and
determining a selected curvature that is an arc defined by the vehicle position, the intersection point, and the heading angle.

* * * * *

UNITED STATES PATENT AND TRADEMARK OFFICE
CERTIFICATE OF CORRECTION

PATENT NO. : 9,969,389 B2
APPLICATION NO. : 15/145103
DATED : May 15, 2018
INVENTOR(S) : Brett Stephens et al.

It is certified that error appears in the above-identified patent and that said Letters Patent is hereby corrected as shown below:

In the Claims

Column 11, in Line 60, replace "wherein the instructions farther" with -- "wherein the instruction further" --.

Signed and Sealed this
Eighteenth Day of September, 2018

Andrei Iancu
*Director of the United States Patent and Trademark Office*